United States Patent
Bieger et al.

(10) Patent No.: US 9,781,454 B2
(45) Date of Patent: Oct. 3, 2017

(54) PLAYBACK OF MEDIA DATA AT REDUCED SPEED

(71) Applicant: CONTINENTAL AUTOMOTIVE GMBH, Hannover (DE)

(72) Inventors: Stefan Bieger, Nidda (DE); Gerhard Dochow, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/424,554

(22) PCT Filed: Aug. 6, 2013

(86) PCT No.: PCT/EP2013/066438
§ 371 (c)(1),
(2) Date: Feb. 27, 2015

(87) PCT Pub. No.: WO2014/032913
PCT Pub. Date: Mar. 6, 2014

(65) Prior Publication Data
US 2015/0208106 A1    Jul. 23, 2015

(30) Foreign Application Priority Data
Aug. 29, 2012 (DE) .......... 10 2012 215 352

(51) Int. Cl.
*H04N 21/24* (2011.01)
*H04N 21/439* (2011.01)
(Continued)

(52) U.S. Cl.
CPC ........ *H04N 21/2401* (2013.01); *H04H 20/22* (2013.01); *H04L 65/80* (2013.01);
(Continued)

(58) Field of Classification Search
CPC .......... H04N 21/2401; H04N 21/4331; H04N 21/4383; H04N 21/4392; H04N 21/44004;
(Continued)

(56) References Cited

U.S. PATENT DOCUMENTS 9,047,236 B2 *   6/2015   Gigliotti ................ G06F 15/16
2005/0280519 A1  12/2005  Nagata
(Continued)

FOREIGN PATENT DOCUMENTS

BE    EP 1879393 A2 *   1/2008   ............. H04N 5/783
DE    103 22 557 A1    12/2004
(Continued)

OTHER PUBLICATIONS

Office Action dated Apr. 11, 2013 issued in the corresponding German Patent Application No. 10 2012 215 352.7.

*Primary Examiner* — Hai V Tran
(74) *Attorney, Agent, or Firm* — Cozen O'Connor

(57) ABSTRACT

A method for reproducing, i.e., playing back, media data includes: receiving media data in a receive buffer; determining whether the receive buffer is sufficiently filled; reducing the playback speed over a period until the receive buffer is sufficiently filled, and playing back the media data at the reduced playback speed. The reduced playback speed has a speed profile having at least one non-linear section.

10 Claims, 3 Drawing Sheets

(51) Int. Cl.
*H04N 21/44* (2011.01)
*H04H 20/22* (2008.01)
*H04L 29/06* (2006.01)
*H04N 5/783* (2006.01)

(52) U.S. Cl.
CPC ......... *H04N 5/783* (2013.01); *H04N 21/4392* (2013.01); *H04N 21/44004* (2013.01)

(58) Field of Classification Search
CPC ....... H04N 21/44016; H04N 21/41422; H04N 7/17327; H04J 3/06; H04J 3/18
See application file for complete search history.

(56) References Cited

U.S. PATENT DOCUMENTS

| | | | | |
|---|---|---|---|---|
| 2006/0010480 | A1* | 1/2006 | Gaumond | H04N 7/17327 725/134 |
| 2008/0248743 | A1* | 10/2008 | Krinsky | H04H 20/26 455/3.06 |
| 2010/0304702 | A1* | 12/2010 | Anzures | H04H 20/22 455/313 |
| 2011/0216785 | A1* | 9/2011 | Begen | H04J 3/18 370/477 |
| 2011/0225314 | A1* | 9/2011 | Leinonen | H04N 21/4325 709/231 |
| 2012/0290738 | A1* | 11/2012 | Lau | H04L 29/06448 709/231 |
| 2013/0308794 | A1* | 11/2013 | Jochim | H04H 60/27 381/107 |

FOREIGN PATENT DOCUMENTS

| | | |
|---|---|---|
| DE | 10 2004 005 073 A1 | 8/2005 |
| DE | 10 2007 054 562 A1 | 5/2009 |
| DE | 10 2008 038 831 A1 | 2/2010 |
| DE | 102010011098 | 11/2011 |
| EP | 1 879 347 A1 | 7/2006 |
| EP | 1 879 393 A2 | 7/2007 |
| JP | EP 1879347 A1 * | 1/2008 ........ H04L 29/06027 |
| WO | WO 2007/049995 A1 | 3/2007 |
| WO | WO 2008/014214 A1 | 1/2008 |

* cited by examiner

PLAYBACK OF MEDIA DATA AT REDUCED SPEED

CROSS-REFERENCE TO RELATED APPLICATIONS

This is a U.S. national stage of application No. PCT/EP2013/066438, filed on 6 Aug. 2013, which claims priority to the German Application No. DE 10 2012 215 352.7 filed 29 Aug. 2012, the content of both incorporated herein by reference.

BACKGROUND OF THE INVENTION

1. Field of the Invention

The invention relates to a method for reproducing (i.e., playing back) media data, a media reproduction (i.e., playback) apparatus and a vehicle.

2. Related Art

Vehicles, such as automobiles, use a large number of apparatuses to receive and reproduce (i.e., playback) media, such as radio programs, television programs and telephone calls. In this case, digital media data are stored in a reception buffer following reception in order to compensate for the usually discontinuous transmission of digital data in packets.

When digital audio data and/or video data are transmitted from a source to the sink, for example, a stable and interference-free reproduction practically always requires buffering of the data at a receiver end in order to compensate for fluctuations during the data transmission (jitter). Since the buffer first needs to be filled, particularly before the beginning of reproduction, reproduction usually starts after a delay. This becomes noticeable when changing over from one audio stream to another, for example.

A similar problem can arise when different media sources need to be synchronized. An example that may be mentioned is an automobile radio that can receive the same radio station either in analog form using FM or in digital form using DAB. So as always to be able to provide the listener with the best (that is to say: interference-free) sound quality, the radio can change over between reproduction of the analog signal and the digital signal on a case by case basis. For technical reasons, the audio signal may be subject to a time delay between the two cited reception paths. Should it be desirable to perform the changes as actually as possible, matching therefore needs to take place in the receiver by delaying the leading signal by buffering. In this case, the problem again arises that the selected audio source cannot be reproduced immediately but rather the reception buffer is filled first.

For the time for the buffering, either the audio signal from a previous source continues to be reproduced or the reproduction is muted.

SUMMARY OF THE INVENTION

It is an object of the invention to render the reproduction of digital media more agreeable to a listener/viewer.

One aspect of the invention relates to a method for reproducing digital media data. By way of example, the media data may comprise audio data and/or video data.

According to one embodiment of the invention, the method comprises:
 receiving media data in a reception buffer;
 establishing whether the reception buffer is filled;
 reducing the reproduction speed over a period of time until the reception buffer is sufficiently filled; and
 reproducing the media data at the reduced reproduction speed.

By way of example, the digital media data are received in data packets that are first of all stored in a reception buffer. If the reception buffer is empty or no longer sufficiently filled to be able to ensure continuous reproduction of the media data at a normal reproduction speed, the reproduction speed is temporarily reduced, so that the media data are reproduced more slowly when new media data arrive. This allows the reception buffer to fill.

By way of example, a situation in which the reception buffer is not sufficiently filled may arise when a program or a media stream is changed, as is the case when changing a radio program, for example. Such a situation can also arise when reproduction of the media data is started, for example at the beginning of media reproduction, such as when a headset is switched on. In all of these situations, the media reproduction can start immediately when the first media data from the selected media source arrive at the receiver.

According to one embodiment of the invention, the reduced reproduction speed has a speed profile having at least one nonlinear section. In other words, the change in the reproduction speed over time does not need to be constant, but rather can increase or decrease. In this way, transitions between reproduction speeds that are greatly different than one another can be compensated for more harmonically.

If just a comparatively small reception buffer needs to be filled, a moderate speed change can suffice. If a large buffer needs to be filled in a short time, however, it may be unavoidable for the slowing of the reproduction to be apparent. In this case, the speed change can also be highlighted as an "effect" in which the speed profile at the reduced reproduction speed is modeled.

By way of example, this can be accomplished by making the reproduction speed similar to that of a tape drive starting to turn or to a record player that is speeding up.

In this way, the time needed to fill a reception buffer can be concealed without requiring a signal from an incorrect media source having to be reproduced or the media reproduction having to be muted.

According to one embodiment of the invention, the speed profile has a section in which the reproduction speed increases more than linearly. In other words, the reproduction speed increases over time, with the change in the reproduction speed over time increasing as time goes by. By way of example, this allows a transition between a low reproduction speed, which may be almost zero, and a reproduction speed that corresponds almost to the normal reproduction speed to be modeled. This transition can be modeled as in the case of a starting analog reproduction appliance.

According to one embodiment of the invention, the speed profile has a section in which the reproduction speed increases less than linearly. In other words, the reproduction speed increases over time, with the change in the reproduction speed over time decreasing as time goes by. By way of example, this allows a transition between a reproduction speed that corresponds almost to the normal reproduction speed and the normal reproduction speed to be modeled.

According to one embodiment of the invention, the method also comprises:
 overlaying the media data with a media effect when the reproduction speed has been reduced.

In order to strengthen the impression of a starting reproduction appliance server, it is possible, by way of example, for an audio signal to be overlaid with further tones, for example the crackling of a record player or the sound of a turning tape drive. In this way, it is possible to bridge the time with the actual (but slowed) audio signals and to make this as acceptable as possible to the listener, if need be, by adding audio effects.

A further option is for the audio signal not to be put through to the loudspeakers immediately but rather to be delayed by one second, for example. This allows the buffer to be filled for one second. So as not to hear silence from the loudspeakers for one second, the typical sound of a radio that is tuning through the VFH frequency band can be played. A tuner today is usually so fast that practically no delay arises as a result of tuning. The tuning sound may therefore be an audio sample that is simply played at the appropriate time. In the case of reception appliances with an analog dual tuner, (while one tuner is already at the target frequency and filling the buffer) the second tuner can tune through the band and produce the typical effect.

According to one embodiment of the invention, the method also comprises:

matching a pitch to the reduced reproduction speed.

If the media data comprise audio data, the audio data can be reproduced such that the pitch is increased by the same factor as the reproduction speed is reduced. Appropriate signal processing allows the pitch, which may be distorted as a result of the speed change, to be corrected. In this way, slight changes should be apparent only to a few listeners.

According to one embodiment of the invention, the media data are transmitted via a wireless link. The wireless link may comprise a radio link and/or an infrared link. By way of example, radio programs can be transmitted via a digital radio link. It is also possible to transmit data from a radio receiver to a set of headphones via an infrared link.

A further aspect of the invention relates to a media reproduction apparatus for reproducing media data. By way of example, the media reproduction apparatus may be a radio tuner, an automobile radio, a head unit, i.e., a main unit, which may be located in the central console of a vehicle, or a set of headphones.

According to one embodiment of the invention, the media reproduction apparatus comprises a reception device for receiving digital media data, for example a radio receiver or an infrared receiver; a reception buffer for buffer-storing received media data; and a reproduction device for reproducing media data from the reception buffer. By way of example, the reproduction apparatus may comprise a loudspeaker or a display.

The media reproduction apparatus can carry out the method as claimed in one of the preceding claims, i.e., reduce the reproduction speed of the media data when the reception buffer needs to be filled, for example. The features of the method as described above and below may also be features of the media reproduction apparatus, and vice versa.

A further aspect of the invention relates to a vehicle having a media reproduction apparatus, as described above and below. By way of example, the vehicle may be an automobile, truck, motorcycle or bus.

BRIEF DESCRIPTION OF THE DRAWINGS

Exemplary embodiments of the invention are described in detail below with reference to the accompanying figures, in which.

In principle, identical or similar parts are provided with the same reference symbols.

DETAILED DESCRIPTION OF THE PRESENTLY PREFERRED EMBODIMENTS

Figure 1:
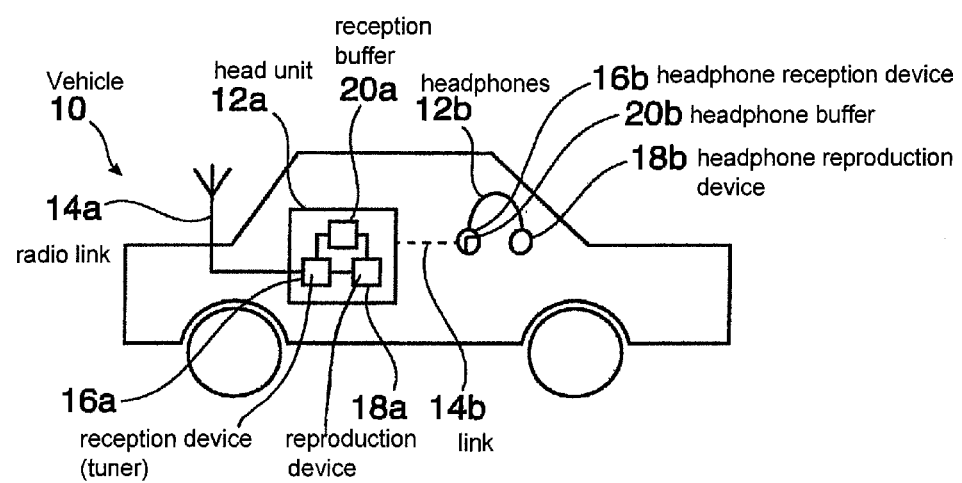
FIG. 1 shows a vehicle having a media reproduction apparatus according to an embodiment of the invention.

FIG. 1 shows a vehicle 10 having media reproduction apparatuses 12a, 12b, in the form of an automobile radio or a head unit 12a and a set of headphones 12b.

The automobile radio 12a or the head unit 12a can receive digital and analog radio programs via a radio link 14a using a reception device (tuner) 16a and can reproduce the radio programs via a reproduction device 18a in the interior of the vehicle 10, for example via loudspeakers.

The media data from a digital radio program are stored in a reception buffer 20a prior to reproduction before being processed further by the reproduction device 18a and converted into an analog signal.

As an alternative to reproduction in the interior of the vehicle 10, the media data can be transmitted in digital form via an infrared link 14b or a radio link 14b to the reception device 16b of the set of headphones 12b. There, the media data are buffer-stored in a reception buffer 20b and output to an ear loudspeaker by a reproduction device 18b.

Figure 2:
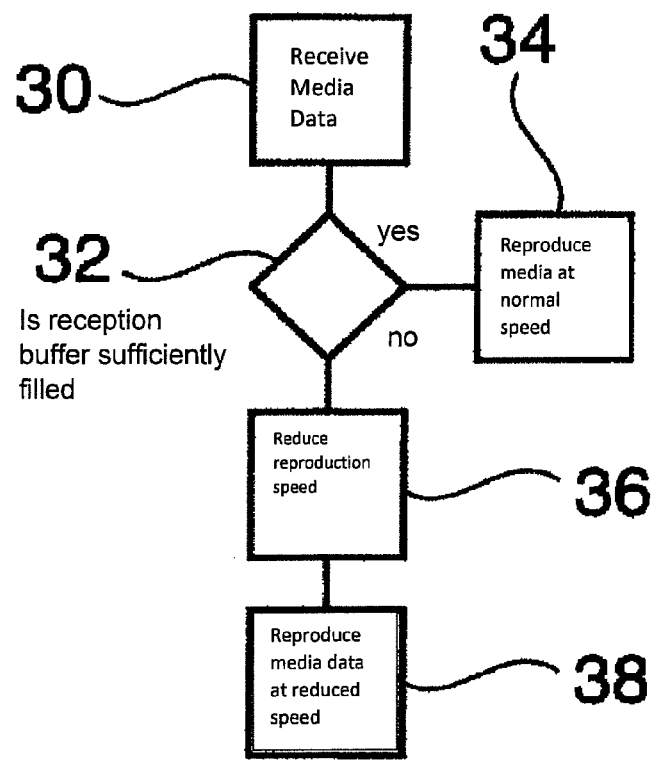
FIG. 2 shows a flowchart for a method for reproducing media data according to an embodiment of the invention.

FIG. 2 shows a flowchart for a method for reproducing media data that can be carried out by the automobile radio 12a, or the head unit 12a, or the set of headphones 12b.

In a step 30, media data are received in a reception buffer 20a, 20b. By way of example, the media data are received by the automobile radio 12a or the head unit 12a and particularly the tuner 16a via the radio link 14a and buffer-stored in the reception buffer 20a. Similarly, the reception device 16b of the set of headphones 12b can receive media data via the link 14b and buffer-store the media data in the reception buffer 20b.

In a step 32, it is established whether the reception buffer 20a, 20b is sufficiently filled. By way of example, the reception buffer may be sufficiently filled if it is at least 80% filled or it contains media data for at least the next two seconds.

If the reception buffer 20a, 20b is sufficiently filled, the media data are reproduced at normal reproduction speed by the reproduction apparatus 18a, 18b in a step 34.

If the reception buffer 20a, 20b is not sufficiently filled, the reproduction speed is reduced over a period of time in a step 36. In this case, the period of time may be chosen such that the reception buffer is sufficiently filled again at the end of the period of time. By way of example, the period of time has a predefined length.

By way of example, a driver of the vehicle 10 can switch on the automobile radio 12a and select an analog FM station. The automobile radio 12a recognizes that the same radio station can also be received in digital quality using DAB, but with a time delay of three seconds. The automobile radio 12a. or the head unit 12a then reduces the reproduction speed smoothly to 95%. As a result, in one minute the reception buffer 20a can be filled with three seconds. A seamless change between DAB and FM is then possible.

Figure 3:
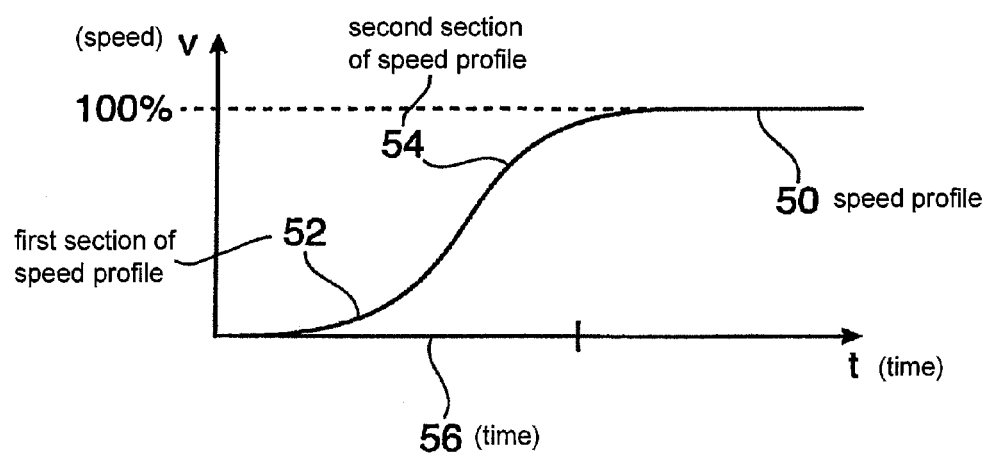
FIG. 3 shows a speed profile for the reproduction of media data according to an embodiment of the invention.

FIG. 3 shows a graph with a possible speed profile 50 for the reproduction of media data. In step 36, to reduce the reproduction speed, the speed profile 50 with at least one nonlinear section 52, 54 is produced or selected.

By way of example, the speed profile 50 is stored in the corresponding reproduction apparatus 12a, 12b or calculated therein.

In the graph, time t is plotted to the right and reproduction speed v is plotted upward. In this case, a reproduction speed of 100% corresponds to a normal reproduction speed.

In the graph, it can be seen that the speed profile 50 has reduced speeds during a period of time 56. In this period of time 56, the reproduction speed rises nonlinearly from 0% to 100%. In a first section 52, the reproduction speed has a positive curvature and the gradient of the curve increases. In a second section 54, the reproduction speed has a negative curvature and the gradient of the curve decreases. In this way, it is possible to achieve a continuous transition for the reproduction speeds in the period of time 56.

The speed profile 50 can additionally be modeled such that the effect of a starting analog reproduction appliance, such as a tape drive or a record player, arises.

In a step 38, the media data are reproduced at reduced reproduction speed by the reproduction apparatus 18*a*, 18*b*. In addition, a media effect, such as crackling, can be overlaid with the reproduced media data in this step. The media effect may be stored in the corresponding media reproduction apparatus 12*a*, 12*b*.

The reception device 16*a* or the radio tuner 16*a* can be located in a separate tuner box, for example, that supplies the head unit 12*a* with a desired radio program by a digital audio stream.

The head unit 12*a* or the set of headphones 12*b* contains a reception buffer 20*b* of three seconds, for example.

The radio listener in the vehicle 10 can then change the tuned station. The tuner box or the reception device 16*a* starts sending the new audio stream or the audio data to the head unit 12*a* or the reproduction apparatus 18*a* thereof. The latter uses the first data packets that arrive to output an audio signal. Since the audio data may still have interference or be incomplete (the stabilizing reception buffer 20*b* not yet being filled at this time), the audio signal is mixed with the sound of a pickup coming down onto a record in order to conceal any interference. In addition, the speed profile 50 is used to simulate the reproduction speed of a record starting to turn. This slowing allows the reception buffer 20*b* to be filled with at least one second fairly quickly, which is sufficient for fairly interference-free operation. Within the next minute, the reception buffer 20*b* is filled to a target level by virtue of the reproduction speed of the audio signal initially remaining indistinguishably reduced.

In addition, it should be pointed out that "comprising" does not exclude other elements or steps, and "a" or "an" does not exclude a large number. Furthermore, it should be pointed out that features or steps that have been described with reference to one of the above exemplary embodiments can also be used in combination with other features or steps from other exemplary embodiments described above.

Reference symbols in the claims should not be regarded as a restriction.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of synchronizing switching over playback from a first media data source to a second media data source, said method comprising:
   receiving media data from the first media data source;
   recognizing that the same content that is received from the first media data source is also receivable from the second media data source, delayed by a first time period;
   buffering the media data received from the first media data source in a reception buffer;
   receiving media data from the second media data source in the reception buffer;
   establishing whether the reception buffer is sufficiently filled;
   while the reception buffer is not sufficiently filled, reproducing the media data received from the first media data source, wherein the reproduction speed of the media data received from the first media data source and buffered in the first reception buffer is reduced over a period of time until the reception buffer is sufficiently filled;
   overlaying the media data received from the first media data source with a media effect when the reproduction speed has been reduced; and
   seamlessly switching over playback, once the reception buffer is sufficiently filled, so as to reproduce the media data from the second media data source.

2. The method as claimed in claim 1, further comprising:
   matching a pitch of the reproduced media data received from the first media data source to the reduced reproduction speed.

3. The method as claimed in claim 1, wherein the media data comprise audio and/or video data.

4. The method as claimed in claim 1, wherein the media data are transmitted via a wireless link.

5. The method of claim 1, wherein:
   the reduced reproduction speed has a speed profile having at least one nonlinear section, the speed profile has a first section in which the reproduction speed has a positive curvature, and
   the speed profile has a second section in which the reproduction speed has a negative curvature.

6. The method of claim 1, wherein the first media data source is an analog media source and the second media data source is a digital media source.

7. A media reproduction apparatus for reproducing media data, comprising:
   a reception device that receives the media data from the first media data source and the media data from the second media data source;
   a reception buffer that buffer-stores the received media data from the first media data source and the received media data from the second media data source; and
   a reproduction device that reproduces the stored media data from the reception buffer,
   wherein the media reproduction apparatus carries out the method as claimed in claim 1.

8. The media reproduction apparatus as claimed in claim 7, wherein the media reproduction apparatus is a radio tuner, a head unit or a set of headphones.

9. The media reproduction apparatus as claimed in claim 7, wherein the media effect is stored in the media reproduction apparatus.

10. A vehicle having a media reproduction apparatus as claimed in claim 7.

* * * * *